(12) United States Patent
Eckhoff

(10) Patent No.: US 10,274,004 B2
(45) Date of Patent: Apr. 30, 2019

(54) THREAD LOCKS AND DEVICES INCORPORATING SAME

(71) Applicant: Douglas Eckhoff, South Haven, MN (US)

(72) Inventor: Douglas Eckhoff, South Haven, MN (US)

( * ) Notice: Subject to any disclaimer, the term of this patent is extended or adjusted under 35 U.S.C. 154(b) by 143 days.

(21) Appl. No.: 15/415,184

(22) Filed: Jan. 25, 2017

(65) Prior Publication Data
US 2017/0211608 A1 Jul. 27, 2017

Related U.S. Application Data

(60) Provisional application No. 62/287,099, filed on Jan. 26, 2016.

(51) Int. Cl.
*F16B 39/34* (2006.01)
*A01K 15/02* (2006.01)

(52) U.S. Cl.
CPC ............ *F16B 39/34* (2013.01); *A01K 15/023* (2013.01)

(58) Field of Classification Search
CPC ..................................................... F16B 39/24
USPC ................. 411/260, 277, 352, 429, 435, 437
See application file for complete search history.

(56) References Cited

U.S. PATENT DOCUMENTS

| | | | | |
|---|---|---|---|---|
| 894,693 A * | 7/1908 | Parkhurst | | |
| 2,756,643 A * | 7/1956 | Prahauser | ................ | B23Q 5/50 192/143 |
| 2,827,973 A * | 3/1958 | Coleman | ................. | B60R 16/04 180/68.5 |
| 2,930,424 A * | 3/1960 | Van Buren, Jr. | ........ | F16B 39/34 411/303 |
| 3,626,458 A * | 12/1971 | Zickos | ................. | G10D 13/028 84/411 R |
| 4,114,506 A * | 9/1978 | Aimar | .................... | F02M 35/00 411/435 |
| 4,230,166 A * | 10/1980 | Layeillon | ................ | F16B 39/24 411/183 |
| 4,906,153 A * | 3/1990 | Duran | .................. | F16B 5/0208 411/103 |
| 5,332,347 A * | 7/1994 | Kimisawa | ............. | F16B 37/042 411/182 |
| 5,444,603 A * | 8/1995 | Otsuka | ................. | B60Q 1/0683 362/273 |
| 5,711,806 A * | 1/1998 | Harnden | .............. | H05K 3/0085 118/407 |
| 6,004,065 A * | 12/1999 | Higdon | ................ | A47B 13/003 108/108 |
| 6,413,005 B1 | 7/2002 | Massie | | |
| 8,011,866 B2 * | 9/2011 | Harris | ................... | F16B 39/282 411/150 |

* cited by examiner

*Primary Examiner* — Gary W Estremsky
(74) *Attorney, Agent, or Firm* — Dicke, Billig & Czaja, PLLC

(57) ABSTRACT

Thread locks that can be used to secure a threaded bolt within an aperture are disclosed. Devices including a threaded aperture, such as a T-bolt, are also disclosed, which can optionally utilize thread locks disclosed herein. Embodiments disclosed herein are particularly useful in farm animal containment structures, however, the scope of the disclosure is not limited to such applications.

20 Claims, 3 Drawing Sheets

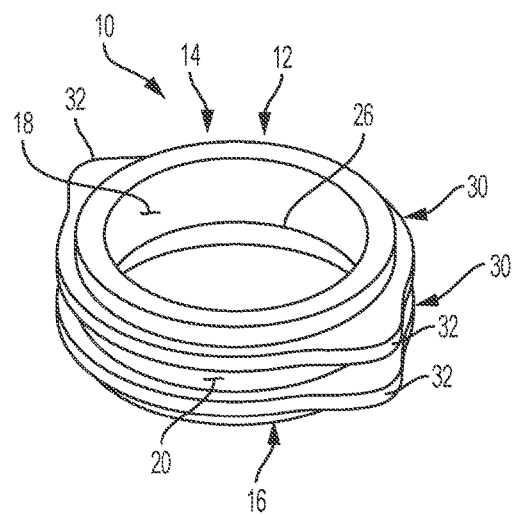
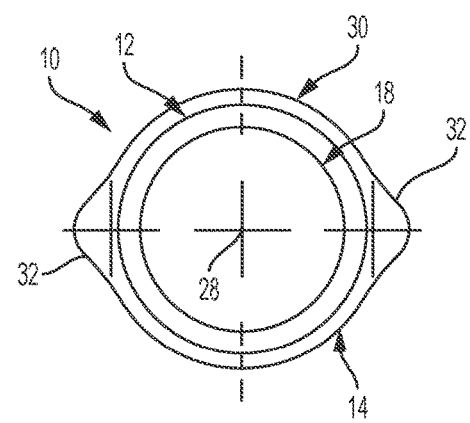
FIG. 1A FIG. 1B
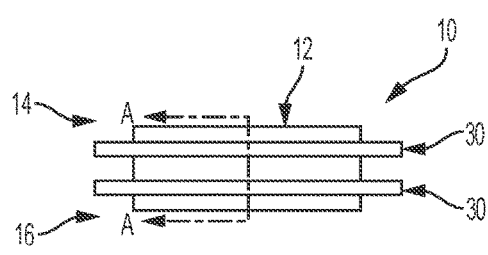
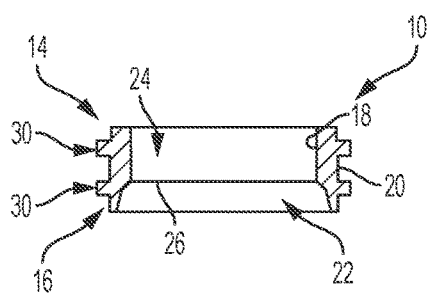
FIG. 1C FIG. 1D

THREAD LOCKS AND DEVICES INCORPORATING SAME

RELATED APPLICATIONS

This application claims priority to U.S. Provisional Application No. 62/287,099, filed on Jan. 26, 2016, which is hereby incorporated by reference in its entirety.

BACKGROUND

The present disclosure relates generally to thread locks that can be used with or incorporated into bolts, latch and hinge assemblies or other devices having a threaded aperture. The thread locks disclosed herein are particularly useful in animal confinement applications.

Animal confinement structures are often used to house and/or contain farm animals. Typical animal confinement structures are constructed with gating or fencing and flooring so that animal waste falls through the slatted flooring. In order to connect the slatted sidewalls to the slatted flooring, fasteners are positioned below the slatted flooring and receive a corresponding fastener bolt through a slat opening. Other similar structures are used to contain multiple animals at a time. In both animal crates and other containment structures, latches and hinges are frequently used with gates to provide access in and out of the structure. Known latches and hinges are typically welded to the structures on which they are positioned, which is generally a time consuming and expensive process that needs to be completed by a skilled laborer. In addition, once installed, such latches and hinges cannot be easily replaced or adjusted. Many known latches and hinges are also insufficient as they can sometimes be opened by the animals and can inadvertently remain in an unlocked position after opening.

The present disclosure addresses problems and limitations associated with the related art and has applications in other fields of technology that will be apparent in view of the disclosure.

SUMMARY

Disclosed embodiments include a thread lock that can be used to secure a threaded bolt within an aperture of various devices, including, but not limited to, T-bolts, latch assemblies and hinge assemblies. The thread locks and apertures are configured in a mating relation to prevent rotation of the thread lock within the aperture. Exemplary thread locks include a body having first and second ends as well as an interior surface and an outer surface. The interior surface includes a tapered end having a smaller thickness as compared to a thickness at an engagement end, which results in the interior surface having a varying diameter. The tapered end and the engagement end are separated by a ridge; wherein the engagement end extends further toward a center of body than the tapered end. The engagement end is configured such that when a threaded bolt contacts the engagement end proximate the ridge, the threaded bolt engages or "bites into" the thread lock to hold the threaded bolt in place.

Devices in which the disclosed thread locks can be used are also disclosed. Such devices are particularly useful in animal containment systems for housing and containing farm animals.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1A is a perspective view of one exemplary thread lock embodiment.

FIG. 1B is a top view of the thread lock of FIG. 1A.

FIG. 1C is a front view of the thread lock of FIGS. 1A-1B.

FIG. 1D is a cross-sectional view of the thread lock of FIGS. 1A-1C as viewed along line A-A.

DETAILED DESCRIPTION

Figure 2A:
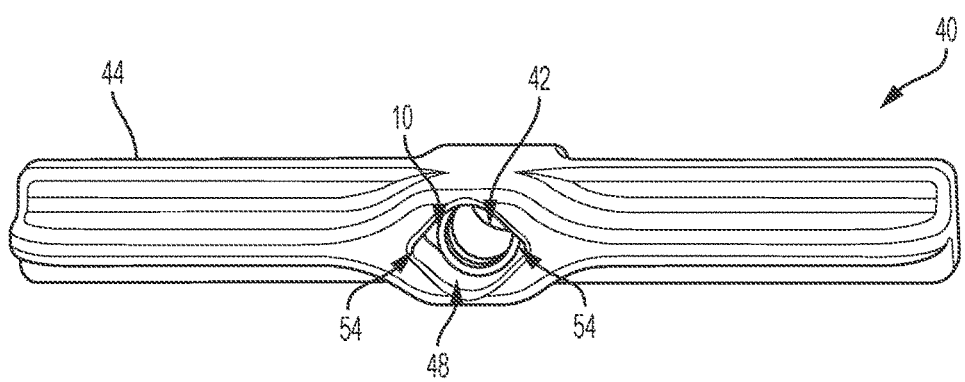
FIG. 2A is a perspective view of the thread lock of FIGS. 1A-1D operably incorporated into an aperture of a T-bolt.

In the following detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this invention be limited only by the claims and the equivalents thereof.

One exemplary thread lock 10 is illustrated in FIGS. 1A-1D. In this embodiment, the thread lock comprises a unitary body 12 made of nylon 66, polyethylene, polypropylene or the like. The body 12 has first and second ends 14, 16 as well as an interior surface 18 and an outer surface 20.

The interior surface 18 includes a tapered end 22 having a smaller thickness as compared to an engagement end 24, which results in the tapered end 22 having a smaller diameter than that of the engagement end 24. The tapered end 22 and the engagement end 24 are separated by a ridge 26; wherein the engagement end 24 extends further toward a center 28 of body 12 than the tapered end 22. The engagement end 24 is configured such that when a threaded bolt (not shown) contacts the engagement end 24 proximate the ridge 26 the threaded bolt cannot move therepast without digging into and engaging the thread lock 10 proximate the ridge 26.

The outer surface 20 includes at least one spaced apart rib 30 circumscribing the outer surface 20. In the illustrated embodiment, the outer surface 20 includes two ribs 30. Each rib 30, in this embodiment, is identical and includes two opposing tabs 32 extending outwardly from the rib 30, however, it is envisioned that fewer or more tabs 32 can be provided. The main function of the tabs 32 is to prevent rotation of the thread lock 10, due to movement of a threaded bolt (not shown) or the like, when the threaded bolt is secured in an aperture (not shown) in which the thread lock 10 is operatively inserted. In this way, the aperture in which the thread lock 10 is maintained is designed to have corresponding recesses to mate with the flanges (see FIGS. 2A-2B, for example). The two ribs 30 are spaced apart in a parallel orientation proximate each of the first and second ends 14, 16 of the body 12.

Figure 2B:
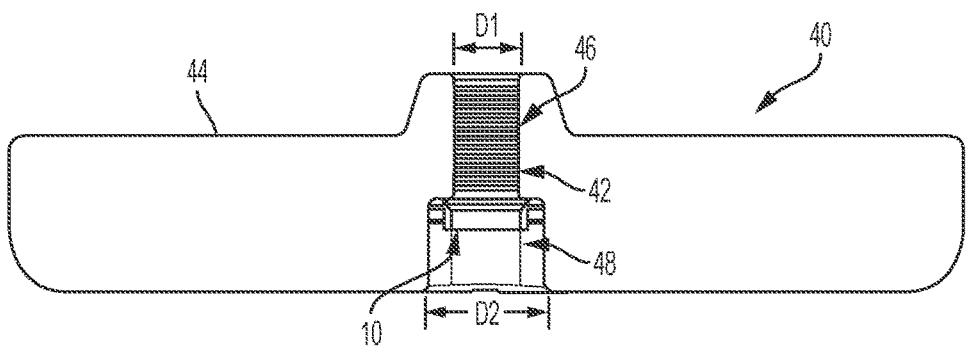
FIG. 2B is a cross-sectional view of the T-bolt and thread lock of FIG. 2A.
Figure 3A:
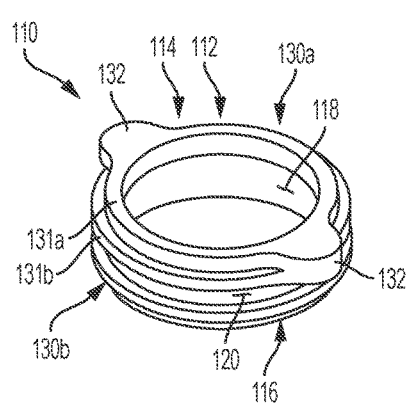
FIG. 3A is a perspective view of one alternate thread lock embodiment.
Figure 3B:
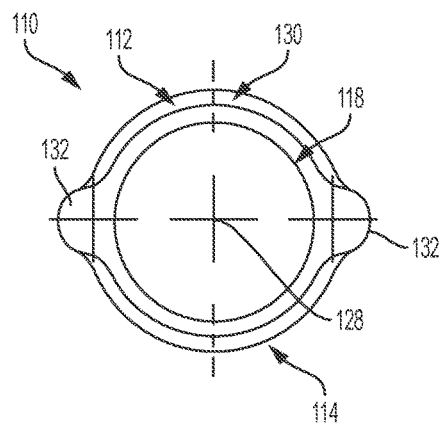
FIG. 3B is a top view of the thread lock of FIG. 3A.
Figure 3C:
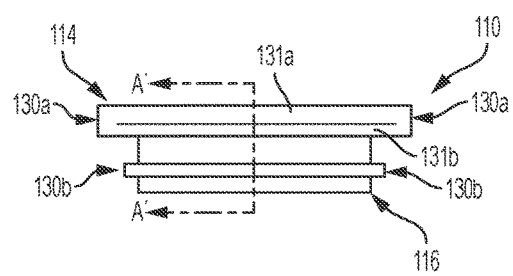
FIG. 3C is a front view of the thread lock of FIGS. 3A-3B.
Figure 3D:
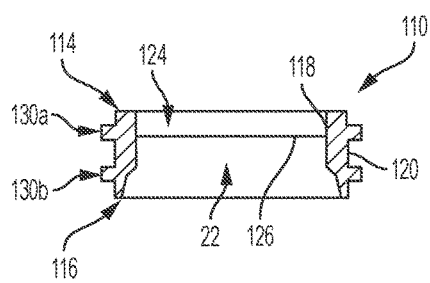
FIG. 3D is a cross-sectional view of the thread lock of FIGS. 3A-3C as viewed along line A'-A'.

Turning now to one exemplary application in which the thread locks of the present disclosure can be utilized. For example, as seen in FIGS. 2A-2B, one thread lock 10 of the present disclosure can be positioned within an aperture 42 of a T-bolt 40. As shown, the exemplary T-bolt 40 includes an elongated body 44 in which the aperture 42 resides. The aperture 42 has a threaded section 46 having a first diameter D1 for receiving a threaded bolt 50 (see also, FIG. 3). The aperture 42 also includes a non-threaded section 48 having a second diameter D2 that is larger than the first diameter D1 and is sized to receive the thread lock 10, at least partially within corresponding flange recesses 54. In the illustrated embodiment, the thread lock 10 is positioned proximate where the threaded section 46 and the non-threaded section 48 meet such that, in operation, the threaded bolt 50 extends through the threaded section 46 and through the thread lock 10. As indicated above, the non-threaded section 48, having recesses 54, and the thread lock 10, having flanges or tabs 32, are arranged and configured to engage each other to prevent rotation of the thread lock 10 within the aperture 42, and thus secure the bolt 50 in place when the threaded bolt 50 is threaded in threaded section 46 and engages the thread lock 10. Such T-bolts 40 utilizing the thread lock 10 are particularly useful in animal containment structures, for example.

An alternate exemplary thread lock 110 is illustrated in FIGS. 3A-3D. In this embodiment, which is substantially similar to that of FIGS. 1A-1D, the thread lock 110 comprises a unitary body 112 made of nylon 166, polyethylene, polypropylene or the like. The body 112 has first and second ends 114, 116 as well as an interior surface 118 and an outer surface 120.

The interior surface 118 includes a tapered end 122 having a smaller thickness as compared to an engagement end 124, which results in the tapered end 122 having a smaller diameter than that of the engagement end 124. The tapered end 122 and the engagement end 124 are separated by a ridge 126; wherein the engagement end 124 extends further toward a center 128 of body 112 than the tapered end 122. The engagement end 124 is configured such that when a threaded bolt (not shown) contacts the engagement end 124 proximate the ridge 126 the threaded bolt cannot move therepast without digging into and engaging the thread lock 110 proximate the ridge 126.

The outer surface 120 includes at least one rib 130a, 130b circumscribing the outer surface 120. In the illustrated embodiment, the outer surface 120 includes two ribs 130a, 130b. In this embodiment, the first rib 130a and second rib 130b are not identically configured. The first rib 130a includes adjacent first and second stepped portions 131a, 131b as well as opposing tabs 132 connected to each portion 131a, 131b. Other tab configurations are envisioned. The first rib 130a is also thicker than the second rib 130b. The second rib 130b may or may not include one or more tabs. As with the embodiment of FIGS. 1A-1D, the main function of the tabs 132 is to prevent rotation of the thread lock 110, due to movement of a threaded bolt (not shown) or the like, when the threaded bolt is secured in an aperture (not shown) in which the thread lock 110 is operatively inserted. In this way, the aperture in which the thread lock 110 is maintained is designed to have corresponding recesses to mate with the flanges (see FIGS. 2A-2B, for example). The two ribs 130a, 130b are spaced apart in a parallel orientation proximate each of the first and second ends 114, 116 of the body 112.

It will be understood that the thread locks disclosed herein can be used with other devices for which bolts are secured and, thus, the present disclosure is not intended to be limited for use with T-bolts. The present disclosure is not intended to be limited to the specific applications illustrated and described, which have been given for clarity of understanding only. It will be apparent to those skilled in the art that many changes can be made in the embodiments described without departing from the scope of the disclosure. Thus, the scope of the disclosure should not be limited to the structures described herein, but only by the structures described by the language of the claims and the equivalents of those structures.

What is claimed is:

1. A thread lock comprising:
a body having first and second ends as well as an interior surface and an outer surface; wherein the interior surface includes a tapered end and an engagement end; wherein the tapered end and the engagement end are separated by and each abut a ridge; wherein the inner surface of the engagement end is continuous from the first end to the ridge; further wherein the outer surface includes a rib circumscribing the outer surface and the rib includes at least one tab extending outwardly with respect to a center of the body.

2. The thread lock of claim 1, wherein the outer surface includes two ribs spaced apart and proximate each of the first and second ends of the body.

3. The thread lock of claim 2, wherein the two ribs are parallel to one another.

4. The thread lock of claim 1, wherein the rib includes two tabs.

5. The thread lock of claim 4, wherein the two tabs are approximately 180 degrees from one another along the rib.

6. The thread lock of claim 1, wherein the body is made of nylon.

7. A combination of a thread lock and device having a threaded aperture; the thread lock being inserted within the device proximate the threaded aperture; wherein the thread lock includes a body having first and second ends as well as an interior surface and an outer surface; wherein the interior surface includes a first portion and a second portion that are separated by and each abut a ridge, the first portion having a tapered end having a larger first diameter than a second diameter of the second portion; wherein the outer surface includes a rib circumscribing the outer surface; wherein the rib includes at least one tab extending outwardly with respect to a center of the body.

8. The combination of claim 7, wherein the outer surface includes two ribs spaced apart and proximate each of the first and second ends of the body.

9. The combination of claim 8, wherein the two ribs are parallel to one another.

10. The combination of claim 7, wherein the body is made of nylon.

11. The combination of claim 7, wherein the rib includes two tabs.

12. The combination of claim 11, wherein the two tabs are approximately 180 degrees from one another along the rib.

13. A T-bolt including an elongated body having an aperture, the aperture including a threaded section and a non-threaded section; the T-bolt further including a thread lock positioned entirely within the non-threaded section at a juncture of the threaded section and the non-threaded section, the thread lock including a body having first and second ends as well as an interior surface and an outer surface; wherein the interior surface includes a tapered end and an engagement end; wherein the tapered end and the engagement end are separated by a ridge; wherein the outer surface includes a rib circumscribing the outer surface, the rib engaging the non-threaded section; wherein the rib includes at least one tab extending outwardly with respect to a center of the body.

14. The T-bolt of claim 13, wherein the outer surface includes two ribs spaced apart and proximate each of the first and second ends of the body.

15. The T-bolt of claim 14, wherein the two ribs are parallel to one another.

16. The T-bolt of claim 13, wherein the body is made of nylon.

17. The T-bolt of claim 13, wherein the aperture defines at least one recess such that the aperture defines a non-circular boundary.

18. The T-bolt of claim 17, wherein the aperture defines two opposing recesses.

19. The T-bolt of claim 13, wherein the rib includes two tabs.

20. The T-bolt of claim 19, wherein the two tabs are approximately 180 degrees from one another along the rib.

* * * * *